United States Patent [19]
Oka et al.

[11] Patent Number: 5,289,479
[45] Date of Patent: Feb. 22, 1994

[54] LASER LIGHT BEAM GENERATING APPARATUS

[75] Inventors: Michio Oka, Kanagawa; Naoya Eguchi, Tokyo, both of Japan

[73] Assignee: Sony Corporation, Tokyo, Japan

[21] Appl. No.: 32,305

[22] Filed: Mar. 17, 1993

[30] Foreign Application Priority Data

Mar. 28, 1992 [JP] Japan .................. 4-102220

[51] Int. Cl.⁵ .............................. H01S 3/10
[52] U.S. Cl. ........................... 372/22; 372/105; 372/92; 372/98
[58] Field of Search ............. 372/21, 22, 105, 92, 372/99, 98, 107, 108

[56] References Cited

U.S. PATENT DOCUMENTS 5,054,027 10/1991 Goodberlet et al. ............. 372/18
5,197,073 3/1993 Oka ............................ 372/22

Primary Examiner—Léon Scott, Jr.
Attorney, Agent, or Firm—Philip M. Shaw, Jr.

[57] ABSTRACT

A laser light beam generating apparatus includes at least one light beam source, resonator and an optical system. The resonator generates a type II second harmonic laser light beam. The resonator has a first reflector, a second reflector, a laser medium provided between the first and second reflectors and irradiated a light beam emitted from the light beam source through the first reflector and a non-linear optical crystal element provided between the laser medium and the second reflector. The optical system radiates the type II second harmonic laser light beam emitted from a virtual luminance point of the resonator to a conjugate point. In this laser light beam generating apparatus, with an effective length of the resonator L, an effective distance Le from the resonator to the conjugate point is set to that $$Le = (m + \tfrac{1}{2})L$$

where m is an integer.

4 Claims, 6 Drawing Sheets

LASER LIGHT BEAM GENERATING APPARATUS

BACKGROUND

1. Field of the Invention

The present invention relates to a laser light beam generating apparatus. More particularly, the present invention relates to a laser light beam generating apparatus including a light source which generates a second harmonic laser light beam using a non-linear optical crystal element.

2. Background of the invention

It has hitherto been proposed to effect efficient wavelength conversion by taking advantage of a high power density in a resonator. For example, investigations are conducted in an external resonation type second harmonic generation or second harmonic generation (SHG) by a non-linear optical element within a laser resonator.

As an example of a laser light beam generating apparatus as a solid state laser generating the second harmonics within a resonator, it has been known to provide an apparatus having a resonator including a pair of reflective mirrors, a laser medium provided between the reflective mirrors and a non-linear optical crystal element provided between one of the mirrors and the laser light medium. In this apparatus, the second harmonic laser light beam may be generated efficiently by phase-matching the second harmonic laser light beam with respect to the laser light beam having the fundamental wavelength.

For realizing the phase matching, type I or type II phase matching conditions need to be established between the laser light beam having the fundamental wavelength and the second harmonic laser light beam. The type I phase matching is based on the principle of producing a phenomenon in which a sole photon having a double frequency is created from two photons polarized in the same direction by taking advantage of the ordinary light of the laser light beam having the fundamental wavelength. On the other hand, the type II phase matching is based on the principle of causing the eigen polarization of the two perpendicular fundamental wavelengths to fall on a non-linear optical crystal element to establish phase matching conditions for each of the two eigen polarization light beams. The laser light beam of the fundamental wavelength is divided into an ordinary light beam and an extraordinary light beam within the non-linear optical crystal element. As a result, the phase matching is carried out for the ordinary light and the extraordinary light beam with the extraordinary light of the second harmonic laser light beam.

However, if it is desired to generate a second harmonic laser light beam using type II phase matching conditions, there is the risk that generation of the laser light of the second harmonics cannot be maintained stably. Because, the eigen polarization is changed in phase each time the laser light beam of the fundamental wavelength traverse the non-linear optical crystal element.

If two perpendicular eigen polarizations, that is p-and s-waves, are deviated in phase each time the laser light beam having the fundamental wavelength produced in the laser medium traverses the non-linear optical crystal element repeatedly by a resonant operation, a strong resonant state, that is strong standing wave, cannot be produced. This is because the steady-state operation in which the two eigen polarizations of the laser light beam of the fundamental wavelength strengthen each other efficiently in each part of the resonator cannot be produced. As a result, the conversion efficiency of the laser light beam of the fundamental wavelength into the laser light beam of the second harmonics is deteriorated with the risk of noise generation in the second harmonics laser light beam.

The present Assignee has already proposed in Japanese Patent KOKAI Publication No. 1-220879 (JP-A-01 220879) a laser light beam generating apparatus to resolve the above-described problem. This laser light beam generating apparatus generating a second harmonic laser light beam using a non-linear optical crystal element has a birefringent element as a quarter wave plate arranged in a resonant optical path of the laser light beam of the fundamental wavelength. In this type laser light beam generating apparatus, the second harmonic laser light beam as an output laser light beam is radiated in a stabile condition.

FIG. 1 shows an example of a laser light beam generating apparatus disclosed in the above-mentioned Japanese Patent KOKAI publication No. 1-220879 (JP-A-01 220879). The laser light beam generating apparatus shown in FIG. 1 includes a resonator 101 which has a laser medium 102 a pair of reflecting surfaces 103, 105, a non-linear optical crystal element 106 and a birefringent element 107 as a quarter wave plate. The laser medium as a Nd:YAG is rod-shaped. One of the reflecting surfaces 103 as a dichroic mirror is formed on the incident surface of the laser medium 102. The other reflecting surface 105 is a dichroic mirror and is formed on the inside surface of an output concave mirror 104. The non-linear optical crystal element 106 is made of KTP ($KTiPO_4$). The birefringent element 107 is made of a quartz plate. The laser medium 102, the non-linear optical crystal element 106 and the birefringent element 107 are provided between the pair of reflecting surfaces 103, 105.

The incident surface of the laser medium 102 arranged in the resonator 101 is irradiated by a pumping laser light beam emitted from a semiconductor laser 111 as a pumping light source via a collimator lens 112 and an objective lens 113. As a result, the laser medium 102 generates a laser light beam of a fundamental 20 wavelength $LA(\omega)$. The laser light beam of the fundamental wavelength $LA(\omega)$ is transmitted through the non-linear optical crystal element 106 and the birefringent element 107 and reflected back at the reflective surface 105 of the concave mirror 104 so as to be transmitted again through the birefringent element 107, the non-linear optical crystal element 106 and the laser medium 102 in this order before being reflected by the incident surface of the laser medium 102. Consequently, the laser light beam of the fundamental wavelength $LA(\omega)$ performs a resonating operation by being propagated back and forth between the reflective surface 103 of the laser medium 102 and the reflective surface 105 of the concave mirror 104 of the resonator 101.

The birefringent element 107, such as the quarter wave plate, has its optical axes so set that, within a plane perpendicular to the direction of light propagation, the direction of the refractive index $n_{e(7)}$ of an extraordinary light is inclined by a predetermined azimuth angle $\theta$ shown in FIG. 2, for example $\theta = 45°$, with respect to the direction of the refractive index of the extraordinary light beam $n_{e(6)}$ of the non-linear optical crystal element 106.

In the above-described laser light beam generating apparatus, a laser light beam of second harmonics LA(2ω) is generated by the laser light beam of fundamental wavelength when the laser light beam of the fundamental wavelength is transmitted through the non-linear optical crystal element 106. The laser light beam of the second harmonics LA(2ω) is transmitted through the concave mirror 104 and outputted as an output laser light beam.

In this state, the ordinary light and the extraordinary light beam of the laser light of the fundamental wavelength LA(ω) are passed through a birefringent element 107. The birefringent element can be defined by a quarter waveplate having a wavelength equal to one-fourth of the wavelength of the laser light beam of the fundamental wavelength, which is set in an azimuth angle θ of 45° with respect to the non-linear optical crystal element 106. As a result, the power of the laser light beam in each region of the resonator 101 is stabilized at a predetermined level. The birefringent element 107 inhibits coupling between two perpendicular intrinsic polarization modes of the laser light beam of the fundamental wavelength LA(ω) caused by generation of the sum frequency, when the laser light beam of fundamental wave length LA(ω) generated in the laser medium 102 is passed through the non-linear optical crystal element 106 in resonance for generating the type II laser light beam of the second harmonics, thereby stabilizing the oscillation.

If an optical system is employed which converges the generated SHG laser light beam on an optical conjugate point to a virtual luminance point of the resonator, for example, a point on an optical disc, for applying the above-described type II SHG laser light beam generating apparatus, a return light beam to the resonator is produced. Although it is possible to reduce the return laser light beam by an optical system using a Faraday element or a quarter wave plate and a polarization prism, it is difficult to reduce the return light beam to zero due to manufacturing tolerances of the optical components and to birefrigence produced at the optical disc.

In the case of the above-described SHG laser light beam generating apparatus only the SHG laser light beam is returned, so that there is no problem of a mode hop noise due to only a minor amount of the light beam being returned as in the case of the conventional semiconductor laser light source. However, the return light beam interferes with the light beam generated at the SHG laser light beam generating apparatus, so that interference noise is produced if the length of the light path is fluctuated on the order of a wavelength.

If the reflectivity of intensity of the return laser light beam of the SHG laser light beam from the optical disc is $R_d$ and the reflectivity of intensity of the mirror within the laser light beam generating apparatus is $R_m$, the peak-to-peak value $N_{pp}$ of the interference noise is given by the formula $$(1 \pm (R_d R_m)^{\frac{1}{2}})^2 = 1 \pm 2(R_d R_m)^{\frac{1}{2}} + R_d R_m$$

$$\therefore N_{pp} = 4(R_d R_m)^{\frac{1}{2}}$$

Consequently, even if $R_d$ and $R_m$ are each 1%, the peak-to-peak value $N_{pp}$ produces an interference noise of 4%, which in turn deteriorates signal characteristics. An interference noise with a backward output is the same as that for $R_m=1$, that is 100%, reflectivity so that, even if the return light beam is 1%, the peak-to-peak value $N_{pp}$ produces an interference noise even reaching 40%, thus tending to modify a laser output.

SUMMARY OF THE INVENTION

It is, therefore, an object of the present invention to provide a laser light beam generating apparatus which resolves the above-described problem.

It is another object of the present invention to provide a laser light beam generating apparatus generating a type II second harmonic laser light beam to prevent fluctuations of the laser output or deterioration in signal characteristics due to the interference noise.

According to this invention, there is provided a laser light beam generating apparatus including at least one light source, a resonator and an optical system. The resonator generates a type II second harmonic laser light beam. The resonator has a first reflector, a second reflector, a laser medium provided between the first and second reflectors. A coherent pump beam optically pumps the gain medium through the first reflector. A non-linear optical crystal element is provided between the laser medium and the second reflector. The optical system radiates the type II second harmonic laser light beam emitted from a virtual luminance point of the resonator to a conjugate point. In the laser light beam generating apparatus, with an effective length of the resonator L, an effective distance Le from the resonator to the conjugate point is set so that $$Le = (m + \tfrac{1}{2})L$$

where m is an integer.

According to this invention, there is provided an optical pickup apparatus for an optical recording medium having at least one light source, a resonator, a deflector and an optical system. The resonator generates a type II second harmonic laser light beam and is radiated a light beam emitted from the light source. The deflector deflects the type II second harmonic laser light beam emitted from the resonator. The optical system includes an objective lens for focusing the type II second harmonic laser light beam emitted from the resonator on the optical recording medium. In the optical pickup apparatus, with an effective length of the resonator L, an effective distance Le from the resonator to the focusing point of the type II second harmonic laser light beam on the optical recording medium is set so that $$Le = (m + \tfrac{1}{2})L$$

where m is an integer.

In the present invention, the interference of the laser light beam of the second harmonics generated in the resonator and the return light beam from the conjugate point is inhibited, the interference noise may be reduced to prevent deterioration in signal characteristics and fluctuations in the laser output. On the other hand, the allowable range of deviations from the design dimensional values of the optical components employed in the optical system, such as the Faraday element, the quarter wave plate or polarization prism, may be enlarged to render it possible to implement an inexpensive system.

BRIEF DESCRIPTION OF THE DRAWING

The invention will be more readily understood with reference to the accompanying, wherein.

DESCRIPTION OF THE INVENTION

Figure 1:
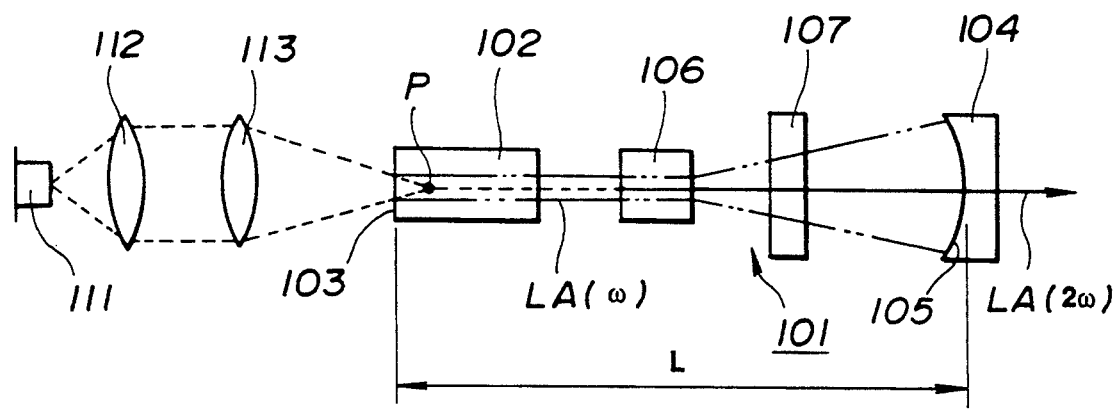
FIG. 1 is a schematic view showing an arrangement of a conventional laser light beam generating apparatus.
Figure 2:
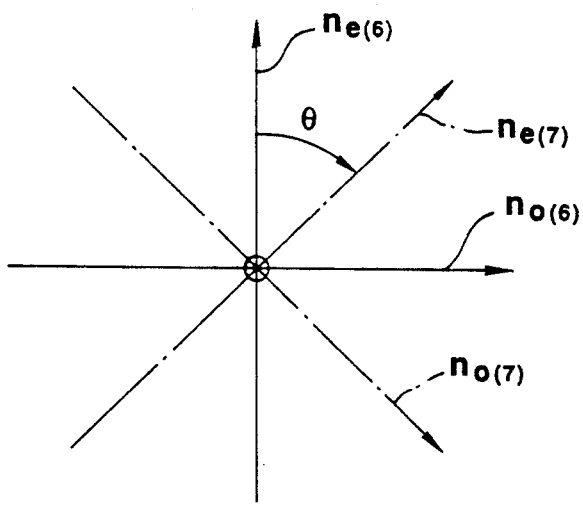
FIG. 2 is a diagrammatic view for illustrating the angle of orientation of the birefringent element employed in the conventional system shown in FIG. 1.
Figure 3:
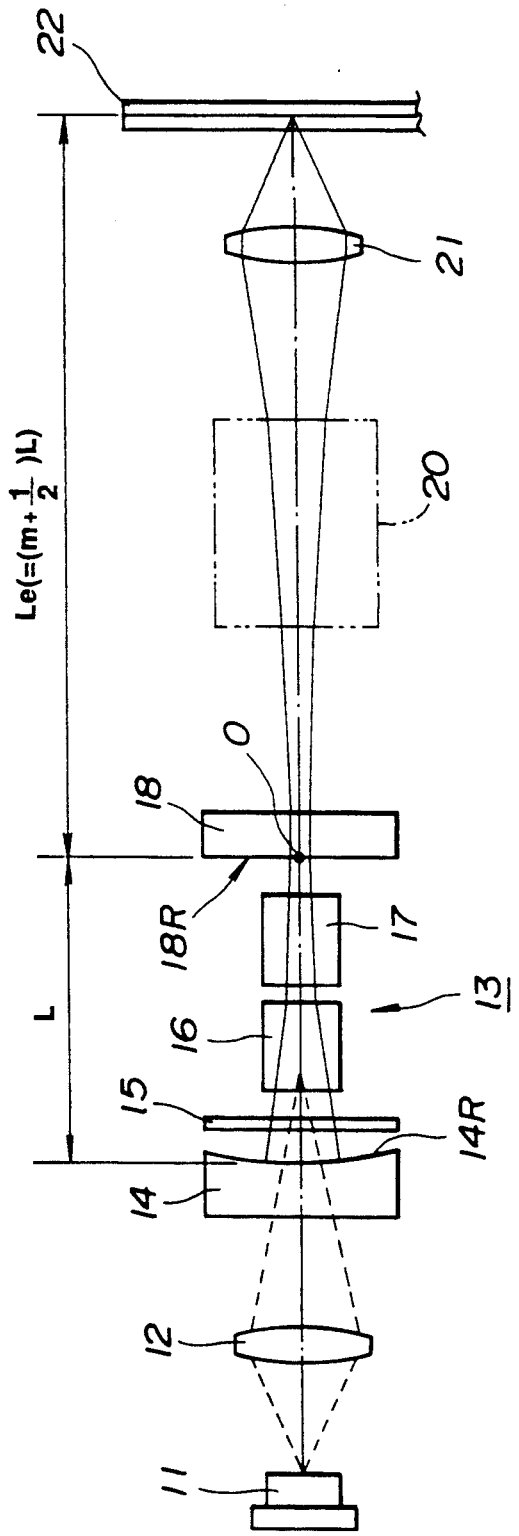
FIG. 3 shows a schematic basic arrangement of a laser light beam generating apparatus according to an embodiment of the present invention.

Referring to the drawings, the referred embodiments of the present invention will be explained in detail. FIG. 3 shows a schematic view of an embodiment of a laser light beam generating apparatus according to the present invention.

In FIG. 3, the laser light beam generating apparatus includes a laser diode 11, such as a semiconductor laser element, a lens 12, a resonator 13, an optical system 20 and an objective lens 21. The laser diode 11 as a pumping light source radiates a pumping light beam. The resonator 13 has a concave mirror 14, a quarter wave plate 15 as a birefringent element, a rod-shaped laser medium 16, such as a Nd:YAG, a non-linear optical crystal element 17, such as a KTP ($KTiOPO_4$) and a plane mirror 18. A reflective surface 14R is formed on an inner concave surface of the concave mirror 14. A reflective surface 18R is formed on one surface of the plane mirror 18. These reflective surfaces 14R, 18R are dichroic mirrors. The pumping light beam radiated from the laser diode 11 is converged by the lens 12 and is incident the laser medium 16 through the concave mirror 14 and the quarter wave plate 15. A laser light beam of a fundamental wavelength $LA(\omega)$ is generated by the laser medium 16 responding to the radiated pumping light beam. The laser light beam of the fundamental wave length $LA(\omega)$ reaches the plane mirror 18 through the non-linear optical crystal element 17 and is reflected by the reflective surface 18R.

As the laser medium 16, $Nd:YVO_4$, LNP, Nd:BEL etc. are employed, whereas, as the non-linear optical crystal element 17, $LiNbO_3$, BBO or LBO etc. may be employed.

By type II phase matching, the non-linear optical crystal element 17 as KTP 17 generates a laser light beam of second harmonics $LA(2\omega)$ having the frequency twice that of the laser light beam $LA(\omega)$. If the wavelength λ of the laser light beam $LA(\omega)$ is 1064 nm, the wavelength of the laser light beam $LA(2\omega)$ is λ/2 or 532 nm. The reflective surface 14R of the concave mirror 14 has such properties as will transmit the pumping light beam with a wavelength of e.g. 808 nm but will reflect the laser light beam $LA(\omega)$ generated in the laser medium 16, while the reflective surface 18R of the plane mirror 18 has such properties as will reflect the laser light beam $LA(\omega)$ but will transmit the laser light beam $LA(2\omega)$ of the second harmonics laser light beam. These reflective surfaces 14R, 18R may be used by dichroic mirrors. Thus the laser light beam of the fundamental wavelength $LA(\omega)$, generated in the laser medium 16, is propagated back and forth between the reflective surface 14R and the reflective surface 18R of the resonator 13 for emitting the laser light beam. It is noted that the quarter wave plate 15 is set at an orientation inclined by an azimuth angle θ of 45° with respect to the non-linear optical crystal element 17 and is used for stabilizing the laser light power in various parts of the resonator 13.

The SHG (second harmonic generation) laser light beam $LA(2\omega)$ emitted from a virtual luminance point of the resonator 13 is converged on an optical conjugate point, such as a point on recording layer (reflective layer) of an optical disc 22 through the optical system 20 and the objective lens 21. In this resonator, the virtual point of the resonator is positioned at a point O shown in FIG. 3. The point O is arranged on the reflective surface 18R and the optical axis of the outputting second harmonic laser light beam. With the length L of the light path of the resonator 13, that is the distance between the reflective surface 14R and the reflective surface 18R, calculated in terms of air, or the effective length of the resonator 13, the effective length Le in terms of air from the outgoing reflective surface 18R of the resonator 13 to the conjugate point satisfies a relation $$Le = (m + \tfrac{1}{2})L \tag{1}$$

where m is an integer.

If the relation of the formula (1) is satisfied, it becomes possible to reduce the interference noise and to prevent fluctuations in the laser output or deterioration of signal characteristics to implement a high performance system. On the other hand, the manufacture tolerance of the Faraday elements employed in the optical system 20, quarter wave plate 15 or other optical components for reducing the return laser light beam may be increased to render it possible to implement an inexpensive system.

The quarter wave plate 15 is a birefringent element which is employed in accordance with the art disclosed by the present Assignee in the Japanese Patent KOKAI Publication No. 1-220879 (JP-A- 01 220879) and in the specification and drawings of the Japanese Patent Application Nos. 2-125854 and 3-17068. The laser light beam is passed through the quarter wave plate 15 set at the azimuth angle of θ=45° with respect to the non-linear optical crystal element 17 for stabilizing the laser light power in various parts of the resonator 13.

That is, by inserting the quarter wave plate 15 into the resonator 13, (i) non-linear coupling between the polarization modes due to sum frequency generation is eliminated to inhibit competition between the polarization modes; and (ii) the spatial phase difference caused by the quarter wave plate becomes equal to 90°, so that the spatial hole burning effect due to emission of two polarization modes may be inhibited to produce stable oscillation of two longitudinal modes (two polarization modes).

In general, in a laser light beam resonated in a resonator, the distance between longitudinal modes, that is the frequency difference between adjacent longitudinal modes for the same transverse mode, is c/2L, where L is the length of the resonator 13 and c the light velocity. In the resonator 13 employing the non-linear optical crystal element 17 performing the above-described type II phase matching and having the quarter wave plate 17 inserted on its light path, the mode frequency distance $\Delta f_B$ is given by $$\Delta f_B = c/4L \quad (2)$$

if the laser light beam of the fundamental wavelength LA($\omega$) having a wavelength $\lambda$ of e.g. 1064 nm is oscillated with the two longitudinal modes (two polarization modes), and L is the light path length between the opposite reflecting surfaces 14R and 18R (effective resonator length in terms of air). Since the SHG laser light beam is taken out as a polarization in one direction, the frequency of each of the longitudinal modes of these eigen polarization modes is doubled so that the frequency distance between adjacent longitudinal modes $\Delta f_{SH}$ is given by $$\Delta f_{SH} = c/2L \quad (3)$$

An electrical field E(z) in the SHG laser light beam when the above-described two longitudinal modes are resonated with the same intensity is found. If $\omega_1, \omega_2$ are angular frequencies of the respective modes, and $k_1$ ($=\omega_1/c$) and $k_2$ ($=\omega_2/c$) are the numbers of waves in each mode, the electrical field E(z) in the SHG laser light beam is given by $$E(z) = E_0 e^{i(\omega_1 t - k_1 z)} + E_0 e^{i(\omega_2 t - k_2 z)} \quad (4)$$

$$= E_0 e^{i(\omega_1 + \omega_2)t/2 - (k_1 + k_2)z/2} \, 2\cos\left((\omega_1 - \omega_2)\frac{t}{2} - (k_1 - k_2)\frac{z}{2}\right)$$

From the above formula (3), the angular frequency between the modes is $$\omega_1 - \omega_2 = 2\pi \Delta f_{SH} = \pi c/L \quad (5)$$

so that the formula (4) may be simplified to $$E(z) = E_0 e^{i(\omega_1 + \omega_2)t/2 - (k_1 + k_2)z/2} \, 2\cos\left(2\pi \Delta f_{SH} \frac{t}{2} - \frac{\pi z}{2L}\right) \quad (6)$$

In the optical system employing the laser light beam generating apparatus, if the reflectivity of intensity of the return light beam from the conjugate point is $R_d$, the reflectivity of the intensity of the SHG laser light beam at the reflective surface 18R of the resonator 13 is $R_m$, these reflectivity $R_d$, $R_m$, which in effect are on the order of several percent, are assumed to be small, and if multiple reflection is disregarded, the forward interference noise intensity $I_1$ and rear interference noise intensity $I_2$ are given by $$I_1 = |E(0) + \sqrt{R_m R_d} \, E(2L_e)|^2 \quad (7)$$

$$I_2 = |E(0) + \sqrt{R_d} \, E(2L_e)|^2 \quad (8)$$

where Le is the distance as far as the conjugate point.

If the formulas (7) and (8) are expanded and a term ($\omega_1 + \omega_2$) oscillated at a high velocity is time-averaged, $$<I_1> = <E(0)E^*(0)> + \sqrt{R_m R_d} <E(0)E^*(2L_e) + E^*(0)E(2L_e)> + R_m R_d <E(2L_e)E^*(2L_e)> \quad (9)$$

is obtained.

The first term of the formula (9) is $$E_0^2 4 <\cos(2\pi \Delta f_{SH})> = 2E_0^2 \quad (10)$$

The second term of the formula (9) is $$\sqrt{R_m R_d} \, E_0^2 4 <(e^{-i(k_1+k_2)L_e} + e^{i(k_1+k_2)L_e})\cos\left(2\pi \Delta f_{SH}\frac{t}{2}\right)\cos\left(2\pi \Delta f_{SH}\frac{t}{2} - \frac{\pi L_e}{L}\right)> = \quad (11)$$

$$\sqrt{R_m R_d} \, E_0^2 8\cos((k_1 + k_2)L_e) \times$$

$$<\cos^2\left(2\pi \Delta f_{SH}\frac{t}{2}\right)\cos\left(\frac{\pi L_e}{L}\right) +$$

$$\cos\left(2\pi \Delta f_{SH}\frac{t}{2}\right)\sin\left(2\pi \Delta f_{SH}\frac{t}{2}\right)\sin\left(\frac{\pi L_e}{L}\right)> =$$

$$\sqrt{R_m R_d} \, E_0^2 4\cos((k_1 + k_2)L_e)\cos\left(\frac{\pi L_e}{L}\right)$$

The third term of the formula (9) is $$R_m R_d E_0^2 4 <\cos^2\left(2\pi \Delta f_{SH}\frac{t}{2} - \frac{\pi L_e}{L}\right)> = 2 R_m R_d E_0^2 \quad (12)$$

Therefore, the forward interference noise intensity $I_1$ and the rearward interference noise intensity $I_2$ are given by $$I_1 = \quad (13)$$

$$2E_0^2 \left(1 + 2\sqrt{R_m R_d} \, \cos((k_1 + k_2)L_e)\cos\left(\frac{\pi L_e}{L}\right) + R_m R_d\right)$$

$$I_2 = 2E_0^2 \left(1 + 2\sqrt{R_d} \, \cos((k_1 + k_2)L_e)\cos\left(\frac{\pi L_e}{L}\right) + R_d\right) \quad (14)$$

In these formulas (13), (14), it is the second term which produces the interference noise. Specifically, the first cosine term that is term, that is $$\cos((k_1 + k_2)L_e) \approx \cos\left(\frac{2\pi L_e}{\lambda/2}\right) \quad (15)$$

represents a term which oscillates at a half wavelength period when the distance to the conjugate point Le in terms of air undergoes extremely small oscillations of the order of the wavelength of light and hence is responsible for the interference noise.

Figure 4:
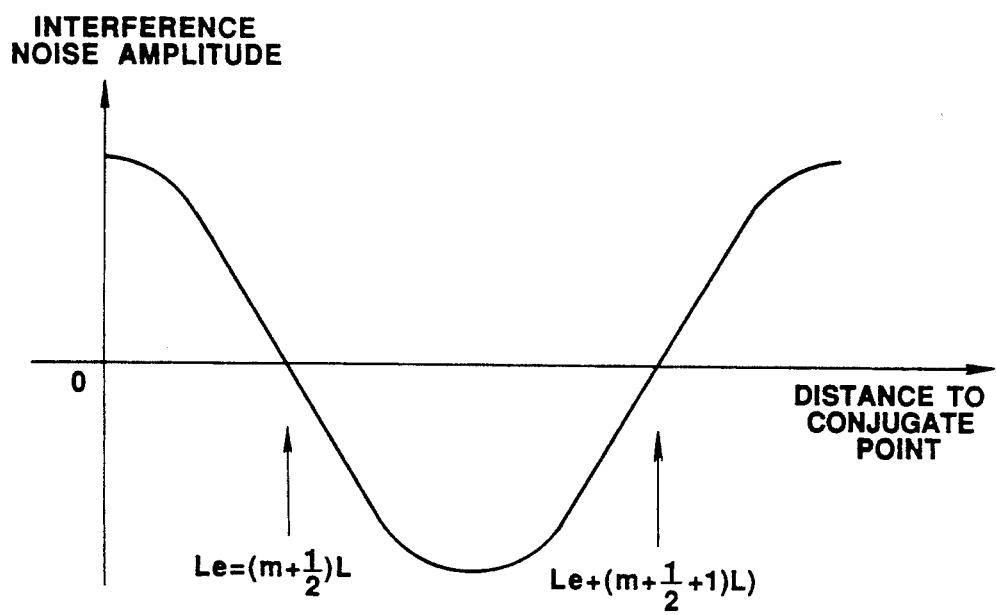
FIG. 4 is a graph showing frequency characteristics for illustrating the embodiment shown in FIG. 3.

The second cosine term cos ($\pi$Le/L) in the second term of the formulas (13), (14) is a term which undergoes moderate oscillations with 2L (L being the length of the resonator of the laser light source) as a period. If the condition of formula (1), that is Le=(m+$\frac{1}{2}$)L, m being an integer, is satisfied, cos($\pi$Le/L) becomes zero. In other words, if the distance as far as the conjugate point Le is (integer+half integer) times the length in terms of air of the resonator, the interference noise in the forward and rearward directions becomes zero. Even if the formula (1) is not satisfied completely, that is if the distance Le is approximately equal to (integer+half integer) times the resonator length L, the interference noise is significantly reduced, as may be seen from FIG. 4.

Figure 5:
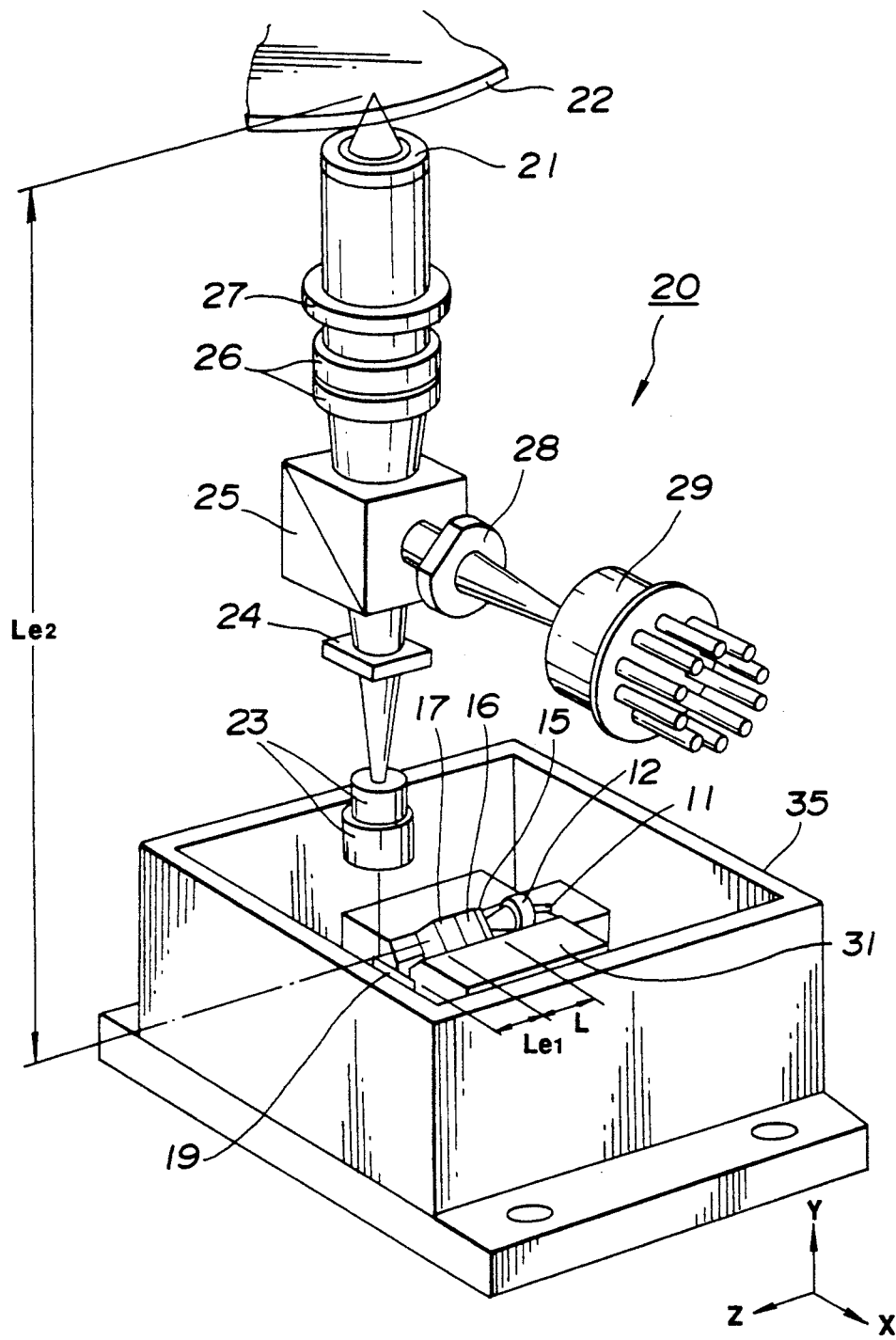
FIG. 5 is a perspective view showing a schematic arrangement of an embodiment in which the laser light beam generating apparatus is applied to an optical pickup apparatus.
Figure 6:
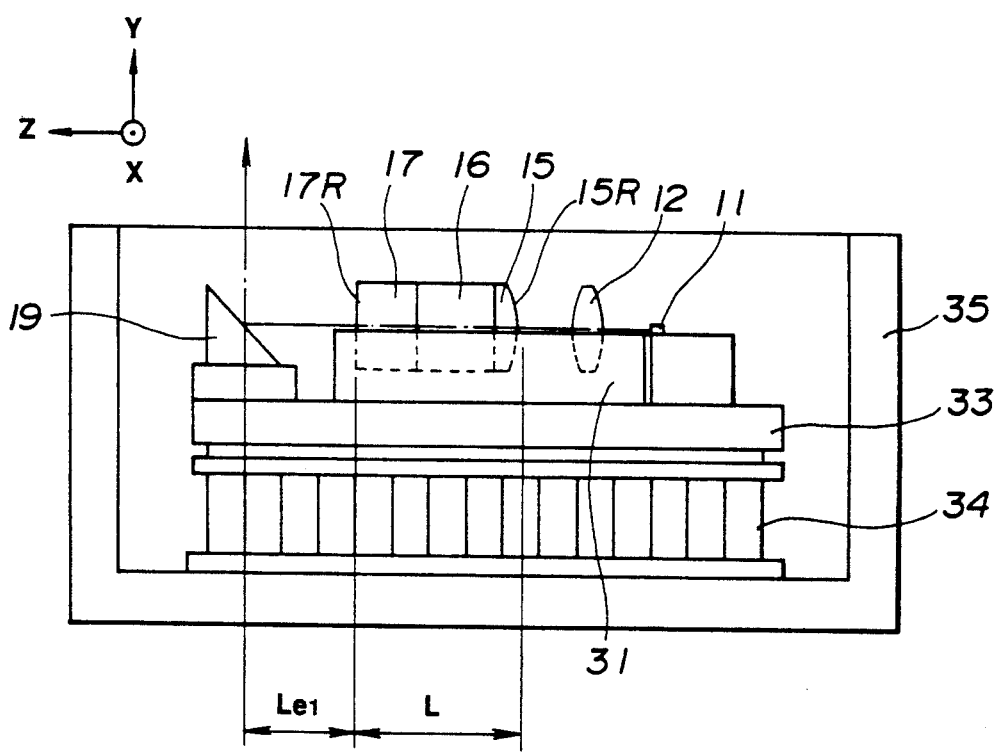
FIG. 6 is a cross-sectional view showing a schematic arrangement of an SHG laser light beam source employed in the optical pickup apparatus shown in FIG. 5.
Figure 7:
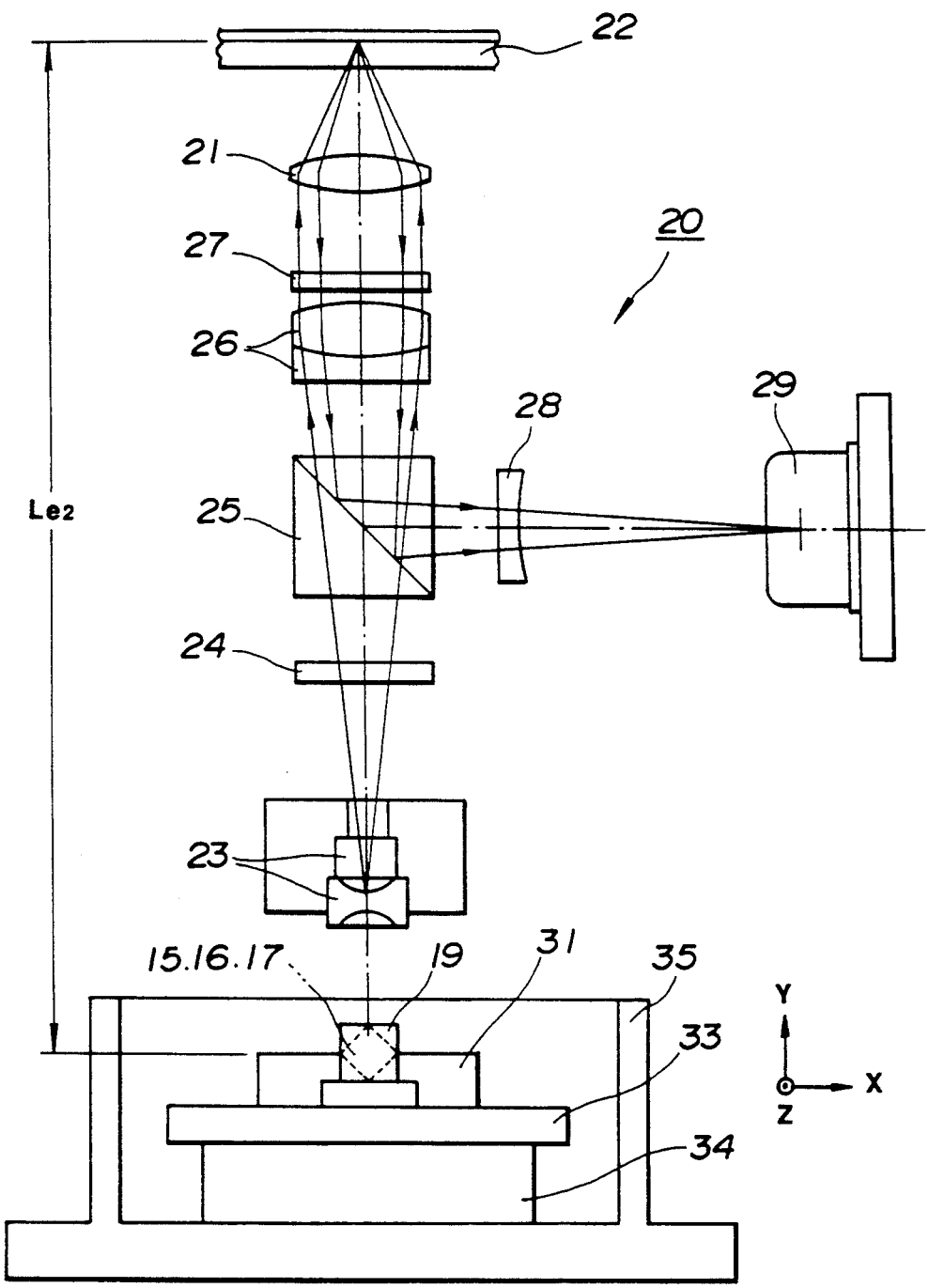
FIG. 7 is a front view showing a schematic arrangement of the apparatus shown in FIG. 5.

FIGS. 5 to 7 show concrete embodiments in which the present invention is applied to an optical pickup apparatus for an optical recording disc. FIG. 5 shows a schematic overall perspective view. FIG. 6 shows a schematic cross-sectional view of an SHG light source. FIG. 7 shows a schematic overall front view. In FIGS. 5 to 7, like elements corresponding to those in FIG. 3 are identified by the same reference numerals and will not be described.

In the optical pickup apparatus shown in FIGS. 5 to 7, the SHG light source having a small-sized and compact design as shown in FIG. 6 is adopted. The pumping light beam emitted from the laser diode 11 is converged by the lens 12 and is incident the laser medium 16 through an incident surface of the quarter wave plate 15. A reflective surface 15 is formed on the incident surface of the quarter wave plate 15 by a coating method and has a wavelength selectivity as a dichroic mirror. The reflective surface 15R transmits the pumping light beam, in which a wavelength is, for example, 810 nm and reflects a laser light beam of the fundamental wavelength, in which a wavelength is, for example, 1064 nm, generated by the laser medium 16. The reflective surface 15R is a concave mirror when seen from the laser medium 16. The laser light beam of fundamental wavelength generating the laser medium 16 is irradiated to the non-linear optical crystal element 17 as KTP (KTiPO$_4$). The second harmonic generation is generated at the non-linear optical crystal element 17 corresponding to the irradiated laser light beam of fundamental wavelength. A reflective surface 17R is formed on the outgoing surface of the non-linear optical crystal element 17. The reflective surface 17R transmits the laser light beam of the fundamental wavelength and reflects a second harmonic laser light beam, in which a wavelength is, for example, 532 nm. The resonator is formed between the reflective surface 15R and the reflective surface 17R.

In the resonator adopted in the optical pickup apparatus shown in FIGS. 5 to 7, the concave mirror 14 and the plane mirror 18 of the resonator 13 shown in FIG. 3 is omitted, and the wavelength selectivity reflective surfaces 15R and 17R are formed on the incident surface of the quarter wave plate 15 and the outgoing surface of the non-linear optical crystal element 17. The quarter wave plate 15, the laser medium 16 and the non-linear optical crystal element 17 are intimately connected with one another. The resonator is accommodated in a V-shaped groove in a resonator securing block 31 in a direction along the Z-axis shown in FIG. 5.

The SHG laser light beam outputted from the reflective surface 17R of the resonator in the Z-axis direction is deflected by a vertically deflecting mirror 19 in a vertical direction, Y-axis direction, shown in FIG. 5 and led to an optical system of the optical pickup apparatus. The SHG laser light beam is irradiated to the optical disc 22.

In the optical pickup apparatus, a mounting block of the laser diode 11, the resonator securing block 31 and a mounting block of the deflecting mirror 19 are mounted on a base 33. The base 33 is temperature-controlled by a sole temperature control device 34, such as a so-called thermoelectric (TE) cooler. These blocks and the base 33 are accommodated in a package 35.

The SHG laser light beam emitted in the Y-axis by the deflecting mirror 19 is transmitted through a concave lens 23 and a grating 24 a polarization beam splitter 25. The SHG laser light beam further is led to the objective lens 21 via a lens 26 and a quarter wave plate 27. The SHG laser light beam is focused on the point of the recording surface of the optical disc 22 as the optical conjugate point. In this case, the sum Le of the distance in terms of air Le$_1$ from the reflective surface 17R as the outgoing surface to the deflecting mirror 19 of the resonator and the distance in terms of air Le$_2$ from the mirror 19 to the recording surface of the optical disc 22 as the optical conjugate point is an (integer plus half integer) times the length in terms of air L between the reflective surfaces 15R and 17R of the resonator, that is the effective resonator length, that is, $$Le = Le_1 + Le_2 = (m + \tfrac{1}{2})L.$$

In this manner, it becomes possible to reduce the interference noise and to prevent deterioration in signal characteristics or fluctuations in the laser output otherwise caused by the interference noise. On the other hand, the manufacture tolerances of the optical components employed the optical system of the optical pickup apparatus, such as the polarization beam spitter 25 or the quarter wave plate 27 may be enlarged to enable implementation of an inexpensive system.

The return light beam from the recording surface of the optical disc 22 is irradiated to the polarization beam splitter 25 through the objective lens 21, the quarter wave plate 27 and the lens 26 and reflected by a boundary surface of the polarization beam splitter 25. The return laser light beam reflected by the polarization beam splitter 25 is received by a photodetector 29 via a multi lens 28, and the recording signals are reproduced.

It is to be noted that the present invention may be applied not only to the above-described optical pickup apparatus but to generation of fourth and higher harmonics, with the use of an external resonator, laser scanning microscope, laser lithography or coupling to optical fibers. The above-described effect may be derived by designing the distance Le to the optical conjugate points of these optical systems in terms of air so as to be equal to substantially (integer+half integer) times the effective resonator length L, that is, by designing the distances so that $Le=(m+\frac{1}{2})L$.

The present invention is not limited to the above-described embodiments. For example, a resonator including an optical path folding type reflective mirror in the optical path in addition to a pair of reflective mirrors on both ends along the resonator optical path may be employed. The laser medium or the non-linear optical crystal element are naturally not limited to Nd:YAG or KTP.

What is claimed is:

1. A laser light beam generating apparatus comprising:
    a resonant cavity including an input mirror and an output mirror, with the effective distance between the mirrors divining a length L;
    a gain medium located in said resonant cavity;
    a type II non-linear optical crystal located in said resonant cavity;
    means for generating a pump beam for optically pumping said gain medium through said input mirror in a manner so that a second harmonic output beam is generated and exits said output mirror; and
    optical system means for directing the second harmonic output beam to a target, wherein the effective distance Le from the output mirror of the resonant cavity to the target is arranged so that $Le=(m+\frac{1}{2})L$ where m is an integer whereby interference noise caused by reflections of the second harmonic beam back into the resonant cavity is reduced.

2. An apparatus as recited in claim 1 further including a birefringent element located in said resonant cavity.

3. An apparatus as recited in claim 1 wherein said optical system means includes a convergent lens for focusing the second harmonic output beam on the target.

4. An apparatus as recited in claim 1 wherein said optical system means includes a deflector for deflecting the second harmonic output beam.

* * * * *